US012625531B2

(12) United States Patent
Elsayed

(10) Patent No.: US 12,625,531 B2
(45) Date of Patent: May 12, 2026

(54) MEASUREMENT-BASED COOLING OF QUANTUM SYSTEMS

(71) Applicant: The American University in Cairo, New York, NY (US)

(72) Inventor: Tarek Ahmed Elsayed, Embaba (EG)

(73) Assignee: The American University in Cairo, New York, NY (US)

( * ) Notice: Subject to any disclaimer, the term of this patent is extended or adjusted under 35 U.S.C. 154(b) by 451 days.

(21) Appl. No.: 18/488,841

(22) Filed: Oct. 17, 2023

(65) Prior Publication Data

US 2025/0036173 A1     Jan. 30, 2025

Related U.S. Application Data

(63) Continuation of application No. 18/225,599, filed on Jul. 24, 2023, now abandoned.

(51) Int. Cl.
G06F 1/20 (2006.01)

(52) U.S. Cl.
CPC ...................................... G06F 1/20 (2013.01)

(58) Field of Classification Search
CPC ......................................................... G06F 1/20
See application file for complete search history.

(56) References Cited

U.S. PATENT DOCUMENTS

| | | | | |
|---|---|---|---|---|
| 9,317,473 B2 * | 4/2016 | Yao | .......................... | G06F 15/78 |
| 11,543,474 B1 * | 1/2023 | Schwindt | ............. | G01R 33/022 |
| 2022/0269971 A1 * | 8/2022 | Garg | ...................... | H10N 60/20 |

OTHER PUBLICATIONS

Practical algorithmic cooling technique for MRI and NMR Imaging. University of Waterloo. Retrieved Jul. 2022 from https://uwaterloo. ca/research/practical-algorithmic-cooling-technique-mri-and-nmr-imaging.
Tarek A. Elsayed, Measurement-based cooling of many-body quantum systems. Jul. 24, 2022. arXiv:2207.11726 [quant-ph].
Dasari, et al. Anti-Zeno purification of spin baths by quantum probe measurements. arXiv:2108.09826v1 [quant-ph] (Aug. 22, 2021).
Puebla et al., Measurement-based cooling of a nonlinear mechanical resonator, arXiv:2003.11168v3, Jun. 2020.
Sørensen, et al., Quantum control with measurements and quantum Zeno dynamics, arXiv:1806.07793v2.
Ashhab et al., Control-free control: Manipulating a quantum system using only a limited set of measurements. arXiv:1011.4463v2 Dec. 2010.
Mirasola, et al., Cooling fermions in an optical lattice by adiabatic demagnetization. Physical Review A 98, 033607 (2018).

* cited by examiner

*Primary Examiner* — Gregory H Curran
(74) *Attorney, Agent, or Firm* — LUMEN PATENT FIRM

(57) ABSTRACT

A technique is provided for cooling generic many-body quantum systems of unknown Hamiltonians to their ground states with a very high fidelity. The technique works by switching on a strong field and applying a sequence of projective measurements and RF pulses to polarize the system along the direction of the external field before we adiabatically switch the field off. The evolution of the system towards its ground state is governed by the quantum adiabatic theorem. We numerically simulate the proposed technique for quantum spin chains with long and short range interactions.

20 Claims, 3 Drawing Sheets

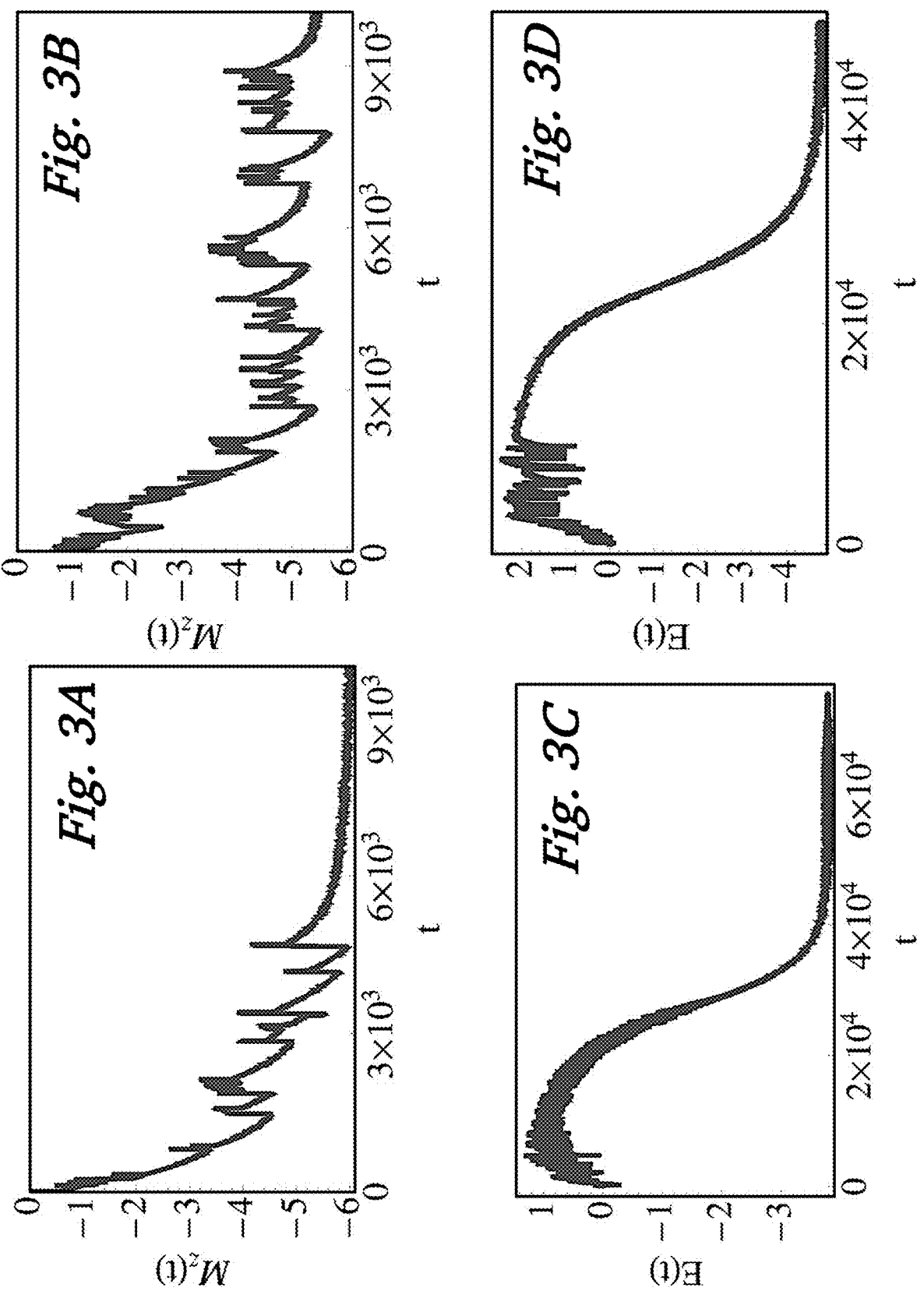

MEASUREMENT-BASED COOLING OF QUANTUM SYSTEMS

CROSS-REFERENCE TO RELATED APPLICATIONS

This application is a continuation of U.S. patent application Ser. No. 18/225,599 filed Jul. 24, 2023, which is incorporated herein by reference.

FIELD OF THE INVENTION

The present invention relates generally to the field of quantum control. More specifically, it relates to measurement-based cooling of quantum systems to near absolute zero.

BACKGROUND OF THE INVENTION

Many technologies require working with quantum systems near absolute zero temperature. There remains a need, however, for efficient and simple techniques that can cool down quantum system that are amenable to measurement with very high fidelity.

SUMMARY OF THE INVENTION

Herein is disclosed a technique that allows cooling down a small quantum system (i.e., systems of less than 100 atoms), especially in nuclear magnetic resonance applications, to very close to its ground state. This technique, more generally, can be used for cooling generic many-body quantum systems of unknown Hamiltonians to their ground states with a very high fidelity.

The technique works by switching on a strong field and applying a sequence of projective measurements and radiofrequency (RF) pulses to polarize the system along the direction of the external field before we adiabatically switch the field off. The evolution of the system towards its ground state is governed by the quantum adiabatic theorem. We numerically simulate the proposed technique for quantum spin chains with long and short range interactions.

Application of this technique include improving resolution of NMR imaging of small samples (nano-sized), and improving the efficiency of quantum sensors which require very low temperature. Examples of such sensors include Diamond Nitrogen-Vacancy Centers, Quantum Dots and Hyperpolarized Nanoparticles.

In one aspect, the invention provides a method for cooling a many-body quantum system, the method comprising: a) switching on a magnetic field, wherein the many-body quantum system is in the magnetic field; b) applying a sequence of projective measurements and radiofrequency (RF) pulses to polarize the many-body quantum system along a direction of the magnetic field; and c) adiabatically switching the magnetic field off.

In some implementations, the many-body quantum system has fewer than 100 atoms. In some implementations, the many-body quantum system is a nano-sized system. In some implementations, the magnetic field alters the energy spectra and eigenstates of the many-body quantum system. In some implementations, the magnetic field has a strength substantially larger than a typical interaction strength of nearby magnetic dipoles of atoms of the many-body quantum system. In some implementations, the magnetic field has a strength at least one order of magnitude stronger than a typical interaction strength of a bare Hamiltonian ($H_0$) of the many-body quantum system. In some implementations, the magnetic field is less than one Tesla. In some implementations, the projective measurements are spin polarization measurements. In some implementations, the projective measurements are spin polarization measurements of randomly chosen individual particles along the direction of the external field. In some implementations, the RF pulses are applied perpendicular to the magnetic field. In some implementations, the RF pulses have a strength of the same order of magnitude as an interaction strength between particles of the many-body quantum system. In some implementations, the RF pulses have a frequency equal to a few multiples of a typical interaction constant of a bare Hamiltonian ($H_0$) of the many-body quantum system. In some implementations, applying a sequence of projective measurements and radiofrequency (RF) pulses comprises measuring a particle repetitively, separated by periods of unitary evolution under the effect of RF perturbation until the particle has been projected onto a correct direction. In some implementations, applying a sequence of projective measurements and radiofrequency (RF) pulses comprises pausing between two successive measurements of the same spin for a time interval of at least half a cycle of the RF pulse. In some implementations, adiabatically switching the magnetic field off comprises performing adiabatic depolarization. In some implementations, adiabatically switching the magnetic field off comprises gradually reducing the field intensity to zero. In some implementations, adiabatically switching the magnetic field off comprises reducing the field intensity to zero following an exponential decay. In some implementations, adiabatically switching the magnetic field off comprises decreasing the field such that a rate of change of the field is less than a characteristic time scale of internal dynamics of the many-body quantum system. In some implementations, applying a sequence of projective measurements and radiofrequency (RF) pulses comprises repeatedly polarizing a spin of a selected particle by a projective measurement and allowing the particle to unitarily interact with the many-body quantum system to transfer part of a polarization of the selected particle to the rest of the system, wherein a time interval between successive projective measurements is shorter than a timescale of intrinsic dynamics of the many-body quantum system. In some implementations, applying a sequence of projective measurements and radiofrequency (RF) pulses comprises using results of measuring individual quantum particles of the many-body quantum system to control perturbation of the quantum system by the RF pulses.

BRIEF DESCRIPTION OF THE DRAWINGS

FIG. 3A, 3B. Graphs of the evolution of the total magnetization for quantum spin chains of 14 spin-½ particles with short-range and long-range interactions respectively while applying the scheme of repetitively measuring one single probe spin to polarize the system along an external magnetic field B.

FIG. 3C, 3D. The evolution of the instantaneous energy of the bare Hamiltonian, $\langle H_0 \langle$, for both systems during the adiabatic evolution of the system while slowly switching off B. The adiabatic evolution starts at $t=10^4$.

DETAILED DESCRIPTION OF THE INVENTION

The problem of driving a quantum system very close to its ground state has been of great interest for a long time [1-3] and belongs to the field of quantum control [4]. Controlling the dynamics of a quantum system typically involves monitoring a few parameters of the system and it usually employs a feedback loop in order to stabilize the state of the system against the effects of the environment [5]. A major problem in the quantum control is the back-action entailed by the measurement on the system. This problem could be mitigated by evading the effect of the back-action [6, 7]. Recently, however, other schemes have been proposed that actually harness the effect of the projective measurement on the system and make use of the back-action as a part of the technique itself [8-11].

Figures 1A, 1B:
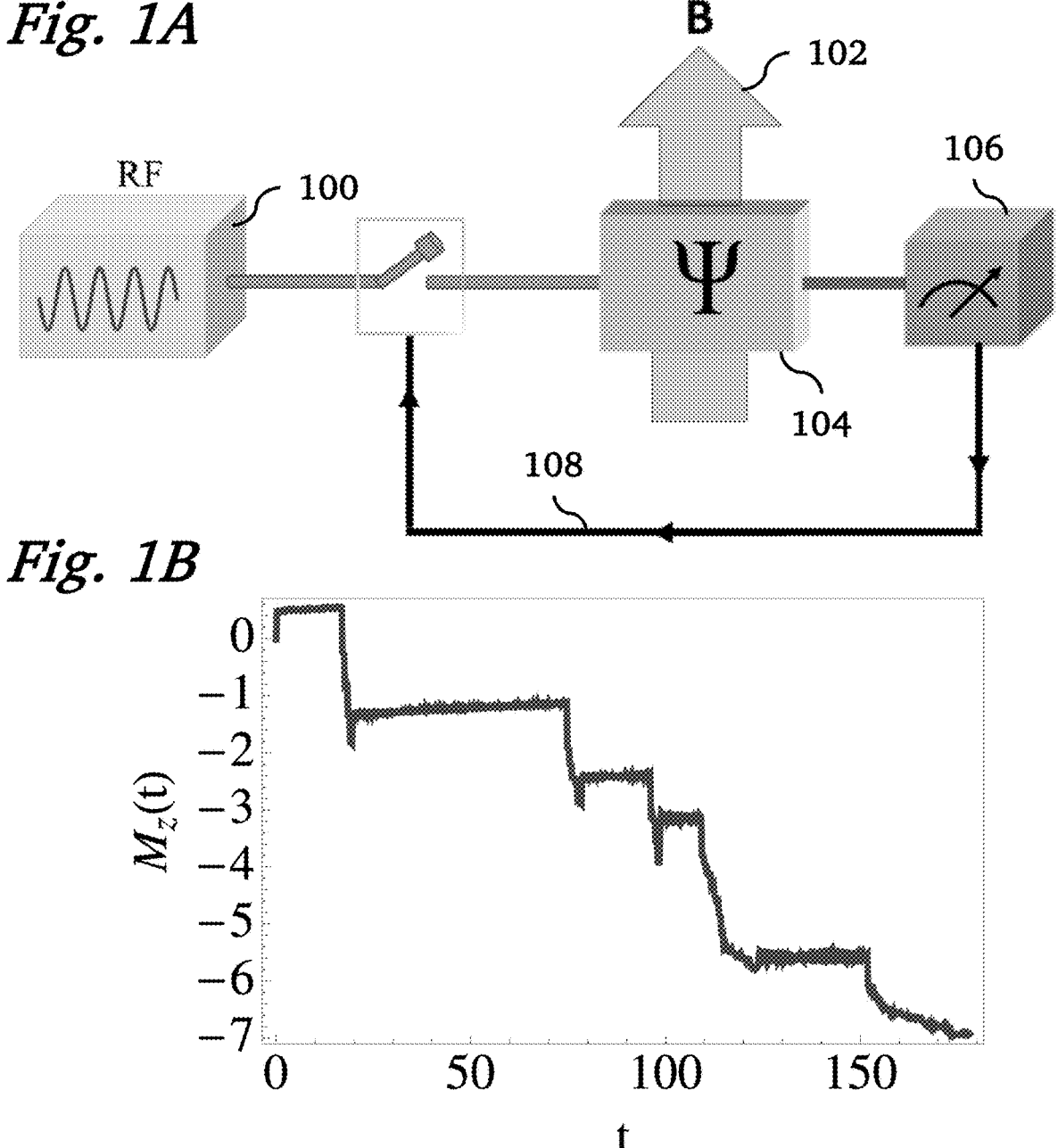
FIG. 1A. Schematic illustration of the quantum control circuit according to an embodiment of the invention. The results of measuring individual quantum particles are used to control the perturbation of the quantum system by RF pulses.
FIG. 1B. A graph or the evolution of the total magnetization of a system of 14 spin-½ particles while applying the measurement-based polarization technique, starting from an unpolarized state.
Figures 2A, 2B, 2C, 2D:
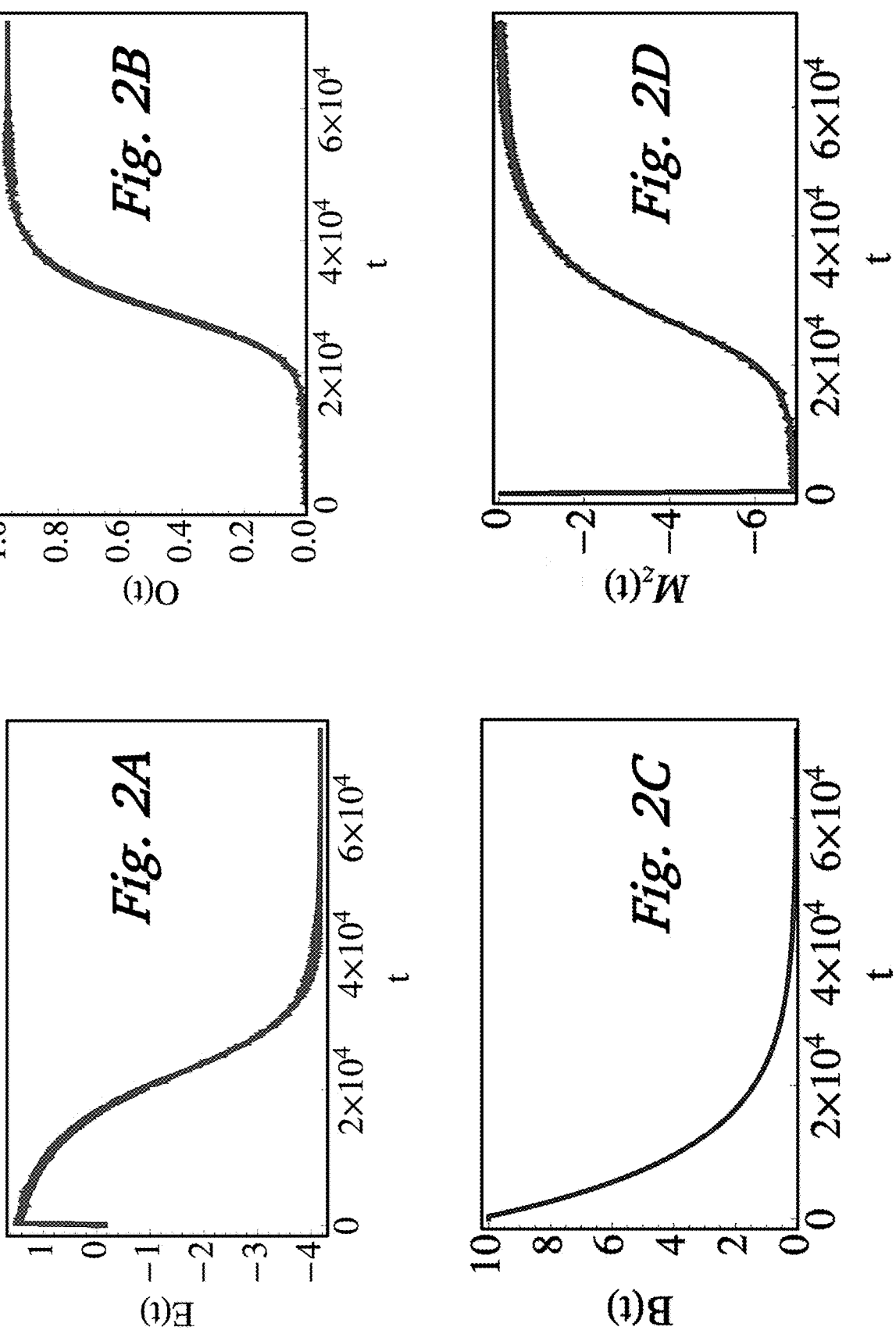
FIG. 2A. A graph of the evolution of the instantaneous energy of the bare system $\langle H_0 \langle$ during the adiabatic evolution while slowly switching off the magnetic field.
FIG. 2B. A graph of the overlap between the instantaneous state and the ground state of the bare system $|\langle \Psi_0 | \Psi(t) \langle |^2$ FIGS. 2C, 2D. Graphs showing the value of B (t) as it changes from 10 to 0 and the change of the total magnetization of the system with time as the field is slowly switched off. The initial spikes in FIG. 2A and FIG. 2D correspond to the initial phase of polarizing the system along the external magnetic field.

Here we disclose a new technique in this regard. FIG. 1A shows a quantum control circuit according to an embodiment of the invention. The results of measuring 106 individual quantum particles of the quantum system 104 are used to control 108 the perturbation of the quantum system by RF pulses 100. More specifically, we adiabatically evolve a generic quantum system 104 of many interacting particles towards its ground state after polarizing it by applying a sequence of projective measurements and RF perturbations 100.

The technique proposed below is valid for a generically interacting many-body quantum system in an unknown state (typically a high temperature state) and aims to drive the system to its ground state or very close to it. The many-body quantum systems of concern here have 3 to 100 atoms. The interaction between the constituents of such systems hugely affect the dynamics and makes the process of making predictions also difficult. Usually, we make predictions about their behavior by doing numerical simulation as done in this work. All nano-sized systems used as quantum sensors in the field of NMR can be considered many-body quantum systems.

An efficient method that is often used for that purpose is the adiabatic demagnetization [12] which requires an initially fully polarized state. However, bringing the system to this state is a challenge in itself, especially if the system is in contact with an environment. A system in thermal equilibrium in a strong magnetic field will have typically a very small polarization, determined by the temperature and the magnetic field strength. The technique we propose here to polarize the system makes use of the fact that it is much easier to polarize small parts of the system one at a time while imparting a minimal disturbance to the rest of the system instead of polarizing the whole system in one shot.

The technique has two steps. In step I, an external strong field B 102 is applied which alters the energy spectra and eigenstates of the system, letting the ground state of the new Hamiltonian have a very large polarization antiparallel to B. The strength of the field is preferably much stronger than the typical interaction strength of nearby magnetic dipoles of the atoms. Typically, if we assume that it will be an order of magnitude larger than the typical interaction, the magnetic field 102 will be a small fraction of a Tesla. This field will create an alteration of the energy spectra to the extent of making the true ground state of the system very close to the fully polarized state. Preferably, this is a very large polarization that is a nearly complete polarization where almost all the spins are polarized anti-parallel to B. Attaining all spins polarized completely, however, is practically unattained due to the interactions between the particles. In addition, during step I, the field is a spatially homogeneous field and constant in time.

We then make a sequence of spin polarization measurements 106 of randomly chosen individual particles along the direction of the external field. If the particle is aligned antiparallel to B, we do nothing. Otherwise, if it is aligned parallel to B, we perturb the system by an RF field 100 perpendicular to B for a certain time interval before we make another measurement of the same particle. The strength of the RF pulses 100 is taken to be of the same order of magnitude as the interaction strength between the particles and the RF frequency to be a few multiples of the typical interaction constant of the bare Hamiltonian ($H_0$). The time interval of the RF perturbation is preferably of the order of magnitude of the period of the RF pulse.

We keep measuring the same particle repetitively at specific times separated by periods of unitary evolution under the effect of the RF perturbation until it has been projected onto the correct direction. If we repeat this procedure many times (much more than the total number of particles) before the system relaxes back to thermal equilibrium, the system will eventually be polarized along B, and thus its entropy will be hugely reduced. Of course, while measuring a certain particle and perturbing the system, the state of a previously measured particle will be altered. Nevertheless, our numerical simulations show that by applying this scheme the system will always find a path towards the fully polarized state. When the system is fully polarized, it will be very close to the ground state of the new Hamiltonian.

In step II, we do an adiabatic depolarization, which is a well-known technique used for attaining very low temperatures [13-15], by switching off the external field 102 very slowly (i.e., gradually reducing the field intensity to zero). The rate of change of the decreasing external field is preferably slower than the characteristic time scale of the internal dynamics of the system 104.

According to the quantum adiabatic theorem, the state of the slowly varying Hamiltonian will remain in the vicinity of the ground state of the instantaneous Hamiltonian. Eventually, when the field 102 is completely off, the system will be found very close to its true ground state. Note that applying this scheme does not require knowing the exact Hamiltonian of the bare system.

Let us illustrate how this technique works with a detailed example. Consider an isolated quantum spin ½ chain of N particles with periodic boundary conditions and local interactions (nearest neighbor interaction). The Hamiltonian is $$H_0 = \sum_m S_m^x S_{m+1}^x + \sum_m 0.5(S_m^y S_{m+1}^y - S_m^z S_{m+1}^z) + \sum_m 0.3\, S_m^y,$$

where $S_m^i$ is the spin operator for the m-th spin in the i-th direction. This system has a ground state energy $E_0=-4.189$ J (we take $\hbar=1$ and $\gamma=1$ throughout this description, where $\gamma$ is the gyromagnetic ratio). The last term in the Hamiltonian is added to break the degeneracy of the ground state. The chain is initially in an infinite temperature pure state, and we switch on an external magnetic field B in the z direction of strength $B_0=10$ which adds a term $H_z=B_0\Sigma_m S_m^z$ to the Hamiltonian. A time step of dt=0.001 s is used in the simulation while a fourth-order Runge-Kutta method is used to evolve the time-dependent Schrodinger's equation.

Let us assume that we make a measurement of a certain spin along the z direction and find it parallel to B. In a typical Nuclear Magnetic Resonance (NMR) setting, the ideal method to perturb the system in order to flip the direction of a spin to a direction antiparallel to B is to apply a n-pulse to that particular spin. However, selective excitation of individual particles may not be applicable to relatively large systems. As an alternative, we apply a weaker pulse to the whole system which does not perturb it much. In doing so, the repetitive measurement of a certain spin several times while applying the weak RF perturbation in between will increase the likelihood to flip that spin while in the same time not perturb the other particles substantially. Our simulation shows that this technique works so well for systems of interacting quantum spins.

We, therefore, employ a uniform RF field in the x direction which affects all spins equally. This field adds a term $h_x=h(t)\Sigma_m S_m^x$ to the Hamiltonian. The time varying function h(t) is defined as $h(t)=h_0 g(t)\cos(\omega t)$ where $\omega=5$ rad/s (i.e., half Larmor frequency defined as $\gamma B_0$) and the strength of the perturbation $h_0=1$. The function g(t) is an on-off switch equal to 1 or 0 depending on whether we switch on the RF field or not. We make a measurement of a random spin along the z direction every period T. If the spin is found to be pointing down, we select another randomly chosen spin in the next round. Otherwise, if we find the spin pointing up along B, we switch on the RF perturbation and keep measuring it every T. We take T to be equivalent to 0.5 cycles of the RF field. When a large number of successive measurements show that every spin we measure is found to be in the down state, we have a high confidence that the system is fully polarized (a projective measurement of all spins simultaneously can be done in this case).

The advantage of measuring only one single spin at a time is that measuring one single degree of freedom should entail a minimal disturbance to the system. While, here, we measure a single-particle degree of freedom, measuring a collective degree of freedom such as the total magnetization can be employed in other schemes of the feedback control of many-body quantum systems. While it is expected that the average time for the downfall to the fully polarized state increases as the size of the Hilbert space increases, it is not clear yet how the average time scales precisely with the number of spins. Since the proposed scheme requires measuring one particle at a time, the time taken to polarize the majority of spins will at best scale linearly with the size of the system which will make the proposed scheme suitable only for small-sized clusters. Note that for this technique to work effectively for a system in contact with a thermal reservoir, the time taken to fully polarize the system should be less than the relaxation time to equilibrium from the completely polarized state, which may be of the order of $T_1$ relaxation time constant.

In FIG. 1B, we show the total polarization of the system $$M_z \equiv \langle \hat{M}_z \rangle,$$

where $$\hat{M}_z = \sum_m S_m^z$$

during the downfall to the fully polarized state for a system of N=14 spins. In general, $M_z(t)$ will keep fluctuating randomly due to the back action entailed by the measurement and continuous perturbation of the RF field before it eventually embarks on a "free-fall" trajectory to the desired fully polarized state under the successive acts of projective measurement. While the time taken for this event to take place is unpredictable, the spontaneous downfall to the desired state seems to be an unavoidable fate. The essence of the proposed technique is to create a completely stable state (the desired state) and a completely unstable state (the state fully polarized in the opposite direction). The more the system approaches the undesired state, the more RF pulses will be applied to it that drives the system away from that state. Our simulations show that sooner or later, and no matter how large the size of the Hilbert space is, the system will be "attracted" to an unstable path that drives it steadily towards the desired state. The stronger the external field with respect to the typical interaction constants of the bare Hamiltonian $H_0$, the more stable the desired state will be since $\hat{M}_z$ commutes with $H_z$ but not with $H_0$. As mentioned earlier, the fully polarized state in the presence of a strong external field, will be very close to the ground state of the full Hamiltonian $H_0+H_z$. In our case, the ground state energy for $H_0+H_z$ equals $-68.39$ J while the energy of the fully polarized state is $-68.25$ J. In step II of the technique, we switch off the field very slowly by reducing its strength gradually as $B(t)=B_0^* \exp(-t/T_0)$ with $T_0=10^4$ s. In FIGS. 2A-2D, we show the evolution of the energy E(t) of the bare system as B is gradually switched off and the fidelity O(t) of the instantaneous state $|\psi(t)\rangle$ with respect to the exact ground state $|\psi_0\rangle$ defined as $|\langle \psi_0|\psi(t)\rangle|^2$. The achieved energy at the end of the adiabatic evolution approaches $-4.152$ J, which differs from the exact ground state energy by less than 1% while the fidelity approaches 93%.

There are a few control parameters that can be adjusted in this technique for achieving best performance. The strength of the external field is taken to be one order of magnitude stronger than the typical interaction strength of the bare Hamiltonian. Taking it much stronger will produce better fidelity, but, on the other hand, will prolong the adiabatic evolution time as well. The strength of the RF pulses is taken to be of the same order of magnitude as the interaction strength between the particles. A much stronger RF pulse will have the side effect of disturbing the spins which have already been polarized in the desired direction, while a much weaker pulse will not cause enough disturbance to the spin that has been measured to be aligned in the wrong direction.

In typical NMR experiments, the strength of the external field is much stronger than the typical local field at each particle resulting from its interaction with its neighbors.

In this case, the proper RF frequency to be used to perturb the system is the Larmor frequency. In our numerical simulation, where the external field is only an order of magnitude stronger than the local field, we take the RF frequency to be a few multiples of the typical interaction constant of $H_0$. We also take the time interval between two successive measurements of the same spin to be half a cycle of the RF field. This choice will ensure that the spin rotates in one single direction around the x axis, thus maximizing the probability to have it flipped in the next measurement. The probability to flip the spin in the z direction will increase when enough polarization in the xy plane of that particular spin builds up. Letting the rate of projective measurements become too fast compared to the timescales of the intrinsic dynamics will not leave room for spin polarization in the xy plane to develop and, at the same time, will also let the quantum Zeno effect set in, thus freezing out the spin dynamical evolution.

The disclosed technique may be difficult to implement when we cannot selectively measure each spin. Nevertheless, we can still use a variant of the proposed scheme while measuring one single spin that will serve as a probe for the whole system. The idea is to polarize that particular spin in the desired direction by the act of measurement and then let it unitarily interact with the rest of the system for a short time interval. During the unitary interaction, it will transfer part of its polarization to the rest of the system, before we polarize it again by a new projective measurement and repeat this procedure many times. Upon measurement, given that the time interval of unitary evolution is short enough, the probe spin will be projected to the desired direction with a very high probability. If it is projected in the undesired direction, parallel to B, we perturb the system with an RF pulse as we did in the first scheme, and then measure it once more till we project that spin along the desired direction. In order for this scheme to work, the time interval between successive measurements should be shorter than the timescale of the intrinsic dynamics of the system governed by $H_0$. Otherwise, it will have equal probability of being projected in either direction each measurement. On the other hand, as in the previous scheme, it should not be much shorter than the intrinsic dynamics timescale in order to avoid the quantum Zeno effect.

Because we take a single spin to be representative of the rest of the system, it is expected that this scheme will work best when the system exhibits translation-invariance. Note that the role of the strong field in this technique is to make the total polarization a quasi-conserved quantity and thus help in the transfer of the polarization from the probe spin to the rest of the system through the inter-particle interaction between the repetitive acts of measurements. In actual NMR experiments of systems of interacting magnetic dipoles, a very strong field is used, and by working in the rotating reference frame defined by the Larmor frequency, the dipole-dipole interaction Hamiltonian reduces to the so called truncated Hamiltonian which conserves the total magnetization along the magnetic field exactly [16]. After a very large number of projective measurements processes, the magnetic field will be switched off slowly as in the first scheme.

Let us demonstrate the efficiency of this scheme by applying it to the same system above with short-range interactions and another system with long range interaction described by $$H_0 = \sum_{m<n} J_{mn} (S_m^x S_n^x + 0.5(S_m^y S_n^y - S_m^z S_n^z)) + \sum_m 0.3\, S_m^y,$$

where the interaction strength $J_{mn}$ falls off inversely with the distance between spin m and spin n as $|-n|^{-1}$. The ground state energy of this system is $E_0=-6.59$ J. We show in FIGS. 3A-3B the evolution of the total polarization $M_z$ of both systems under the repetitive sequence of measurements of one single spin and the occasional RF excitation pulses. The spikes in $M_z$ occur when the probe spin is occasionally projected in the undesired direction. The smooth parts in the plots correspond to the time intervals of pure repetitive measurements without applying the RF excitation pulses. In these periods, the sequence of measurements and unitary evolution keeps increasing the total polarization of the system. The drawback of this scheme is the very long time taken to polarize the system compared with the first technique that measures all the spins.

We notice in FIGS. 3A-3D that, for the first Hamiltonian with short range interaction, we could achieve a polarization strength of 85% of the maximum polarization while for the second Hamiltonian we arrive at 70% of the maximum polarization. After slowly switching off the magnetic field starting at $t=10^4$ s with a decay constant $T_0=8\times10^3$ s for both systems, we notice in FIGS. 3C-3D that they settle at energies $-3.78$ J and $-4.81$ J which differ from $E_0$ by 10% and 27% respectively. The fidelity of the final state with respect to the ground state in both cases is of the order of 10%.

To conclude, we have demonstrated a cooling technique that can be used to bring a quantum system described by an unknown Hamiltonian in an arbitrary state very close to its ground state using a combination of measurement-based polarization and adiabatic demagnetization. The basic principle is a divide-and-conquer strategy where we avoid the difficult task of polarizing the system directly, which requires exploring the full Hilbert space of the system, and replace it by the easy task of polarizing a small part of it which requires exploring a much smaller Hilbert space.

The later task is easily achieved by the mere act of projective measurement. The first version of the technique measures every particle of the system till it is guaranteed that the majority of the particles are polarized parallel to a strong field. The second version measures one single probe particle successively, allowing it to transfer its polarization to the rest of the system between the successive measurements. In both cases, RF pulses are employed to perturb the system till the particle is measured in the desired direction. Switching off the field slowly brings the system adiabatically to its ground state.

A simple variation of step I will be to make the strength of the RF field dependent on how close we are from the desired state, i.e., to reduce the strength of the perturbation the higher the number of consecutive measurements obtained in the desired direction along the external field. On the other hand, the high polarization obtained in step I of the proposed technique can be combined with usual NMR techniques to achieve a much better resolution in NMR of small spin clusters as an alternative method to increasing the magnetic field strength. Although the treatment presented above focuses on interacting quantum spin systems, the technique can be applied to strongly correlated systems of ultracold atoms in an optical lattice where adiabatic demagnetization has actually been shown to be an effective cooling technique. [12, 17, 18].

REFERENCES

[1] S. Lloyd, Phys. Rev. A 62, 022108 (2000).
[2] A. Reiserer, C. Nölleke, S. Ritter, and G. Rempe, Physical Review Letters 110, 223003 (2013).

[3] L. Magrini, P. Rosenzweig, C. Bach, A. Deutschmann-Olek, S. G. Hofer, S. Hong, N. Kiesel, A. Kugi, and M. Aspelmeyer, Nature 595, 373 (2021).

[4] L. M. K. Vandersypen and I. L. Chuang, Rev. Mod. Phys. 76, 1037 (2005).

[5] D. Dong and I. R. Petersen, IET control theory & applications 4, 2651 (2010).

[6] M. Vanner, J. Hofer, G. Cole, and M. Aspelmeyer, Nature communications 4, 1 (2013).

[7] M. Rossi, D. Mason, J. Chen, Y. Tsaturyan, and A. Schliesser, Nature 563, 53 (2018).

[8] D. B. R. Dasari, S. Yang, A. Finkler, G. Kurizki, and J. Wrachtrup, arXiv preprint arXiv: 2108.09826 (2021).

[9] R. Puebla, O. Abah, and M. Paternostro, Physical Review B 101, 245410 (2020).

J. Sørensen, M. Dalgaard, A. H. Kiilerich, K. Mølmer, and J. Sherson, Physical Review A 98, 062317 (2018). [11] S. Ashhab and F. Nori, Phys. Rev. A 82, 062103 (2010). [12] A. E. Mirasola, M. L. Wall, and K. R. Hazzard, Physical Review A 98, 033607 (2018).

[13] W. Giauque and D. MacDougall, Physical Review 43, 768 (1933).

[14] W. De Haas, E. Wiersma, and H. Kramers, Nature 131, 719 (1933).

[15] Shepherd and G. Feher, Physical Review Letters 15, 194 (1965).

[16] A. Abragam, The principles of nuclear magnetism (Oxford university press, 1961).

[17] P. Medley, D. M. Weld, H. Miyake, D. E. Pritchard, and W. Ketterle, Physical review letters 106, 195301 (2011).

[18] J. Schachenmayer, D. M. Weld, H. Miyake, G. A. Siviloglou, W. Ketterle, and A. J. Daley, Physical Review A 92, 041602 (2015).

The invention claimed is:

1. A method for cooling a many-body quantum system, the method comprising:
   a) switching on a magnetic field, wherein the many-body quantum system is in the magnetic field;
   b) applying a sequence of projective measurements and radiofrequency (RF) pulses to polarize the many-body quantum system along a direction of the magnetic field; and
   c) adiabatically switching the magnetic field off.

2. The method of claim 1 wherein the many-body quantum system has fewer than 100 atoms.

3. The method of claim 1 wherein the many-body quantum system is a nano-sized system.

4. The method of claim 1 wherein the magnetic field alters the energy spectra and eigenstates of the many-body quantum system.

5. The method of claim 1 wherein the magnetic field has a strength substantially larger than a typical interaction strength of nearby magnetic dipoles of atoms of the many-body quantum system.

6. The method of claim 1 wherein the magnetic field has a strength at least one order of magnitude stronger than a typical interaction strength of a bare Hamiltonian ($H_0$) of the many-body quantum system.

7. The method of claim 1 wherein the magnetic field is less than one Tesla.

8. The method of claim 1 wherein the projective measurements are spin polarization measurements.

9. The method of claim 1 wherein the projective measurements are spin polarization measurements of randomly chosen individual particles along the direction of the external field.

10. The method of claim 1 wherein the RF pulses are applied perpendicular to the magnetic field.

11. The method of claim 1 wherein the RF pulses have a strength of the same order of magnitude as an interaction strength between particles of the many-body quantum system.

12. The method of claim 1 wherein the RF pulses have a frequency equal to a few multiples of a typical interaction constant of a bare Hamiltonian ($H_0$) of the many-body quantum system.

13. The method of claim 1 wherein applying a sequence of projective measurements and radiofrequency (RF) pulses comprises measuring a particle repetitively, separated by periods of unitary evolution under the effect of RF perturbation until the particle has been projected onto a correct direction.

14. The method of claim 1 wherein applying a sequence of projective measurements and radiofrequency (RF) pulses comprises pausing between two successive measurements of the same spin for a time interval of at least half a cycle of the RF pulse.

15. The method of claim 1 wherein adiabatically switching the magnetic field off comprises performing adiabatic depolarization.

16. The method of claim 1 wherein adiabatically switching the magnetic field off comprises gradually reducing the field intensity to zero.

17. The method of claim 1 wherein adiabatically switching the magnetic field off comprises reducing the field intensity to zero following an exponential decay.

18. The method of claim 1 wherein adiabatically switching the magnetic field off comprises decreasing the field such that a rate of change of the field is less than a characteristic time scale of internal dynamics of the many-body quantum system.

19. The method of claim 1 wherein applying a sequence of projective measurements and radiofrequency (RF) pulses comprises repeatedly polarizing a spin of a selected particle by a projective measurement and allowing the particle to unitarily interact with the many-body quantum system to transfer part of a polarization of the selected particle to the rest of the system, wherein a time interval between successive projective measurements is shorter than a timescale of intrinsic dynamics of the many-body quantum system.

20. The method of claim 1 wherein applying a sequence of projective measurements and radiofrequency (RF) pulses comprises using results of measuring individual quantum particles of the many-body quantum system to control perturbation of the quantum system by the RF pulses.

* * * * *